United States Patent
Morisawa

(10) Patent No.: US 11,764,655 B2
(45) Date of Patent: Sep. 19, 2023

(54) AXIAL GAP MOTOR, VEHICLE AND AXIAL GAP MOTOR SYSTEM INCLUDING TORQUE CONTROL

(71) Applicant: SUBARU CORPORATION, Tokyo (JP)

(72) Inventor: Ryota Morisawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 56 days.

(21) Appl. No.: 17/411,972

(22) Filed: Aug. 25, 2021

(65) Prior Publication Data

US 2022/0094249 A1  Mar. 24, 2022

(30) Foreign Application Priority Data

Sep. 24, 2020  (JP) ................. 2020-160118

(51) Int. Cl.
| | |
|---|---|
| *H02K 21/02* | (2006.01) |
| *B60L 15/20* | (2006.01) |
| *B60K 1/00* | (2006.01) |
| *H02K 11/20* | (2016.01) |

(52) U.S. Cl.
CPC ............ *H02K 21/026* (2013.01); *B60K 1/00* (2013.01); *B60L 15/20* (2013.01); *H02K 11/20* (2016.01)

(58) Field of Classification Search
CPC ........ H02K 21/026; H02K 11/20; H02K 5/24; H02K 11/21; H02K 21/24; B60K 1/00; B60K 7/0007; B60L 15/20; B60L 2220/50; B60L 2270/145; Y02T 10/72
See application file for complete search history.

(56) References Cited

U.S. PATENT DOCUMENTS

2008/0315818 A1* 12/2008 Fukushige ............. H02P 9/007
                                                        318/491
2019/0131902 A1*  5/2019 Ciciriello ............. F16C 17/026

FOREIGN PATENT DOCUMENTS

| JP | 2005-117834 A | 4/2005 |
| JP | 2019-208297 A | 12/2019 |

OTHER PUBLICATIONS

JP2005117834A English translation (Year: 2022).*

* cited by examiner

*Primary Examiner* — Christopher M Koehler
*Assistant Examiner* — Viswanathan Subramanian
(74) *Attorney, Agent, or Firm* — McGinn I.P. Law Group, PLLC

(57) ABSTRACT

An axial gap motor includes a rotor, a first stator, a second stator, a stator moving unit, and a rotor vibration detector. The rotor is supported by a rotation shaft. The first stator faces the rotor with a predetermined gap in a longitudinal direction of the rotation shaft. The second stator faces the first stator with the rotor being disposed therebetween. The second stator is disposed on an opposite side to the first stator. The second stator faces the rotor with a predetermined gap. The stator moving unit is configured to change a relative position between the first stator and the second stator in a circumferential direction of the rotation shaft. The rotor vibration detector is configured to detect a vibration state of the rotor. The stator moving unit is configured to rotate at least one of the first stator or the second stator with respect to the other around an axis according to a change in the vibration state of the rotor.

20 Claims, 8 Drawing Sheets

AXIAL GAP MOTOR, VEHICLE AND AXIAL GAP MOTOR SYSTEM INCLUDING TORQUE CONTROL

CROSS-REFERENCE TO RELATED APPLICATIONS

The present application claims priority from Japanese Patent Application No. 2020-160118 filed on Sep. 24, 2020, the entire contents of which are hereby incorporated by reference.

BACKGROUND

The present disclosure relates to an axial gap motor and a vehicle including the motor.

An automobile as a transportation device is excellent in convenience, and it is possible to get on the vehicle and go to various places. In recent years, the development of an electric vehicle equipped with an electric motor that replaces a reciprocating engine has been promoted in consideration of an environmental load.

Although a radial gap motor is widely used as an electric motor that can be mounted on a vehicle, for example, the development of an axial gap motor described in Japanese Unexamined Patent Application Publication (JP-A) No. 2019-208297 and JP-A No. 2005-117834 is also promoted. Such an axial gap motor is expected to be reduced in size as a next-generation in-vehicle motor, and includes a disc-shaped rotor in which a plurality of magnets are aligned and fixed in a circumferential direction, and a stator which includes a plurality of coils aligned in the circumferential direction and faces the rotor with a predetermined gap in an axial direction. Since in the axial gap motor, the rotor and the stator face each other with the predetermined gap in the axial direction, the axial gap motor is relatively easy to be reduced in thickness and is suitable as an electric motor for a vehicle.

SUMMARY

An aspect of the disclosure provides an axial gap motor including a rotor, a first stator, a second stator, a stator moving unit, and a rotor vibration detector. The rotor is supported by a rotation shaft. The first stator faces the rotor with a predetermined gap therebetween in a longitudinal direction of the rotation shaft. The second stator faces the first stator with the rotor being disposed therebetween. The second stator is disposed on an opposite side to the first stator. The second stator faces the rotor with a predetermined gap therebetween. The stator moving unit is configured to change a relative position between the first stator and the second stator in a circumferential direction of the rotation shaft. The rotor vibration detector is configured to detect a vibration state of the rotor. The stator moving unit is configured to rotate at least one of the first stator or the second stator with respect to the other around an axis according to a change in the vibration state of the rotor detected by the rotor vibration detector.

An aspect of the disclosure provides a vehicle including the axial gap motor described above.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

It cannot be said that current techniques that are not limited to those in the above-described JP-A No. 2019-208297 and JP-A No. 2005-117834 satisfy needs of a market, and the following problems exist.

For example, in the above-described JP-A No. 2019-208297 and JP-A No. 2005-117834, torque can be increased by narrowing a gap between a rotor and a stator. However, the influence of vibration and eccentricity of the rotor increases particularly in a high-speed rotation region, so that the possibility of damaging the motor increases.

On the other hand, the risk can be avoided by, for example, widening the gap between the rotor and the stator. Further, a technique of reducing the number of interlinkage magnetic fluxes to improve a maximum rotation speed by changing positions of the rotor and the stator is also known, but the efficiency of the motor may decrease because magnetic resistance increases or the interlinkage magnetic fluxes decrease.

Further, in order to avoid contact between the rotor and the stator, it is desirable that the vibration of the rotor can be accurately predicted for each rotation speed. However, in particular, a motor mounted on the vehicle is also subject to a disturbance influence due to external vibration received form a road surface during traveling and a self-excited vibration of a transmission (an oil hop, a gear vibration, or the like), and therefore, there is a possibility that unintentional resonance of the rotor occurs due to such a disturbance influence or the like.

It is desirable to provide an axial gap motor capable of preventing an unintended resonance of a rotor during traveling and a vehicle including the motor.

Next, an embodiment for implementing the disclosure will be described. Further, configurations other than those to be described in detail below may be complemented by various known vehicle structures and structures of axial gap motors including those in, for example, the above-described JP-A No. 2019-208297 and JP-A No. 2005-117834.

Axial Gap Motor 100

Figure 1:
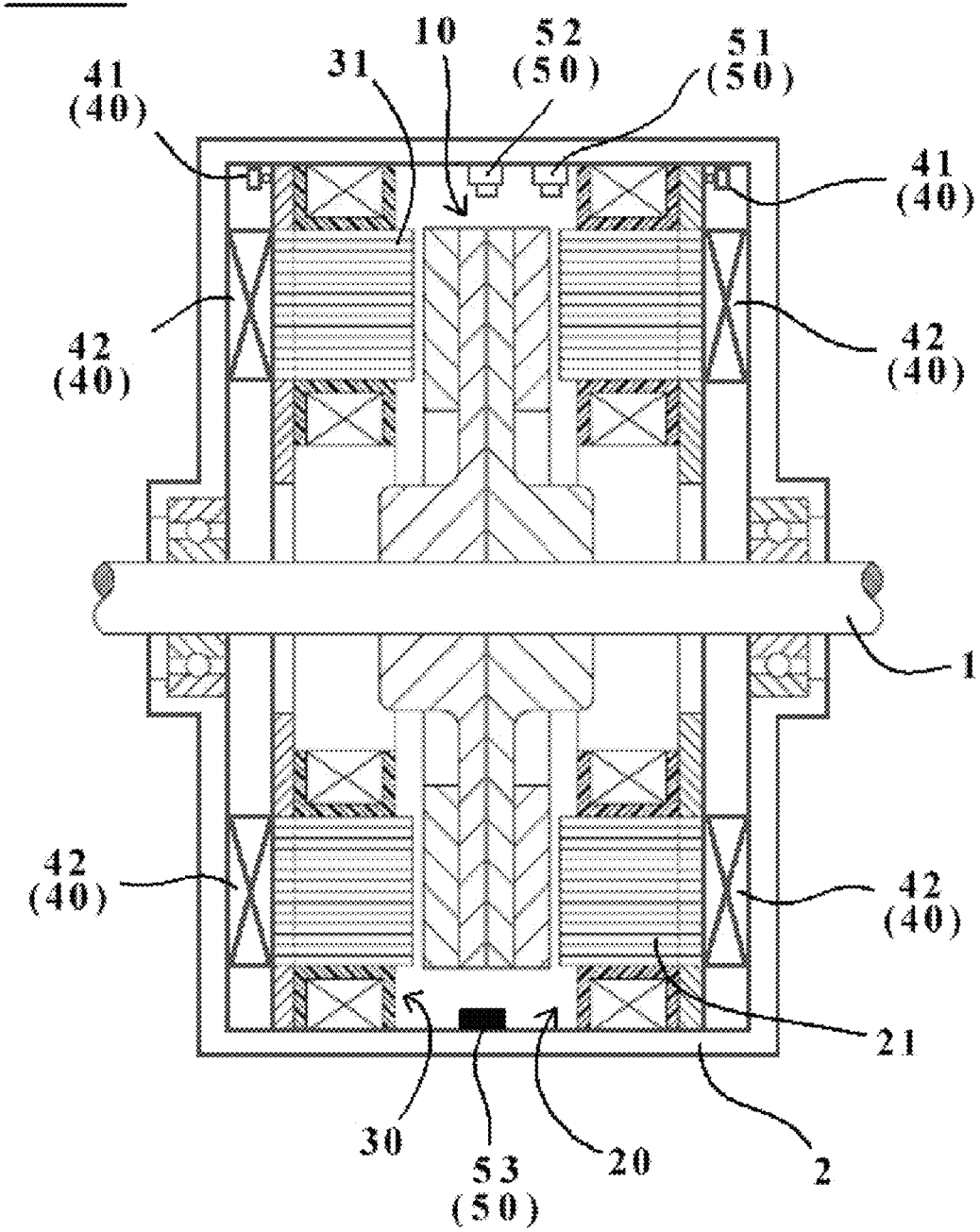
FIG. 1 is a schematic diagram illustrating a cross section of an axial gap motor according to an embodiment.
Figure 2:
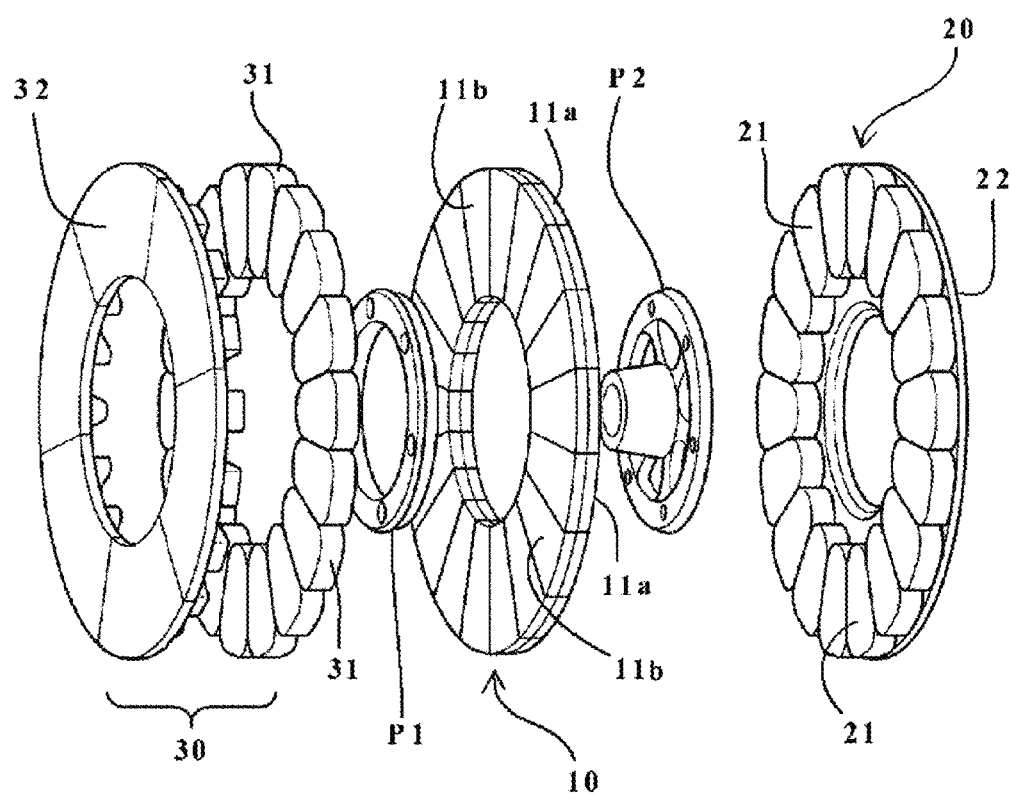
FIG. 2 is a schematic diagram illustrating a positional relationship between a rotor and stators in the axial gap motor of the embodiment.
Figure 3:
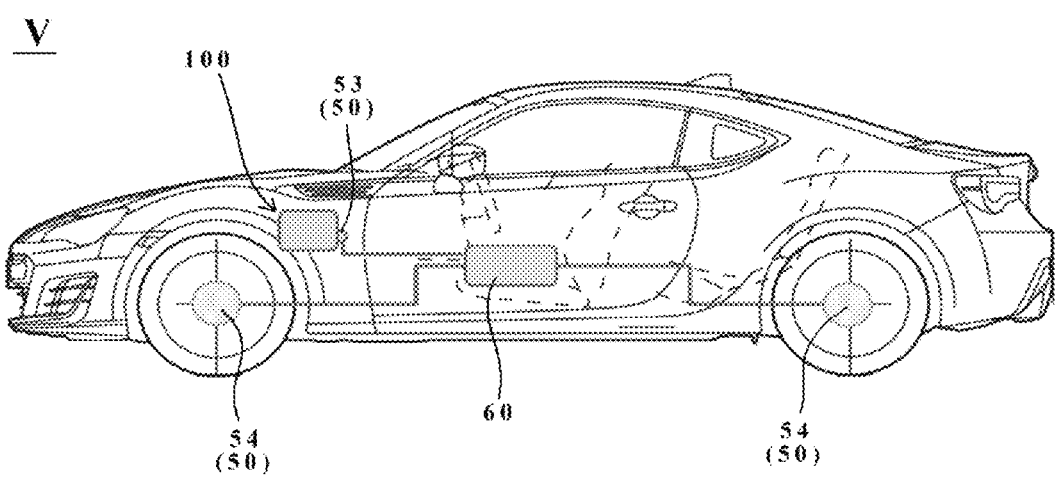
FIG. 3 is a schematic diagram illustrating an external vibration sensor mounted on a vehicle and a controller thereof.

FIGS. 1 and 2 schematically illustrate a structure of an axial gap motor 100 in the present embodiment.

The axial gap motor 100 of the present embodiment is an electric motor mounted on a vehicle V which will be described later, and includes a rotor 10, a first stator 20, a second stator 30, a stator moving unit 40, and a rotor vibration detector 50, or the like. The axial gap motor 100 is controlled by a controller 60 (which will be described later) mounted on the vehicle V.

Examples of the vehicle V include known electric automobiles and hybrid vehicles in which an electric motor as a driving force is mounted. Further, the axial gap motor 100 of the present embodiment can be applied as an electric motor used for powering the vehicle V, but is not limited to such applications, and can also be applied as a vehicle power generator as exemplified in, for example, JP-A No. 2015-2587.

As illustrated in FIG. 1, the axial gap motor 100 includes a motor case 2 that houses the rotor 10 or the like. The motor case 2 is attached to the vehicle V, and is integrally coupled to the rotor 10 via a bearing such as a known ball bearing so as to be coupled to a rotation shaft 1 for transmitting a driving force from the motor to a drive shaft.

The rotor 10 is fixedly supported by the rotation shaft 1 as described above. As can be understood from FIG. 2 that is schematically illustrated, the rotor 10 of the present embodiment has a disc shape having a circular opening in a center, and N/S magnetic poles are magnetized in a predetermined pattern by a magnet made of a known magnetic material. Further, the rotor 10 may be fixed to the rotation shaft 1 in a state of being held between a rotor holding ring P1 and an adapter P2, for example.

The rotor 10 faces a pair of a first stator 20 and a second stator 30, which will be described later, in an axial direction. Therefore, by disposing the magnetic material (a magnet 11a facing the first stator 20 and a magnet 11b facing the second stator 30) on a front surface and a back surface of the rotor 10, both sides of the rotor 10 are magnetized with the above-described N/S magnetic poles.

The first stator 20 faces the rotor 10 with a predetermined gap (a gap in the axial direction) along the rotation shaft 1. The first stator 20 includes a flat plate-shaped base disc 22 having a circular opening in a center such that the rotation shaft 1 can pass through, and a plurality of first teeth 21 disposed adjacently in a circumferential direction on a surface of the base disc 22 facing the rotor 10.

A plurality of winding portions (not illustrated) are wound around each of the first teeth 21 in the first stator 20 via a known insulator. For a more detailed structure of a stator structure, for example, a known stator structure of the axial gap motor in JP-A No. 2019-208297 may be referred to. Further, a material of the first stator 20 is not particularly limited, and known materials including those in JP-A No. 2019-208297 and JP-A No. 2005-117834 can be applied.

The second stator 30 is disposed on an opposite side to the first stator 20 and faces the rotor 10 with a predetermined gap. The second stator 30 has the same structure and material as the first stator 20 except that an orientation thereof is different, and includes a flat plate-shaped base disc 32 having a circular opening in a center such that the rotation shaft 1 can pass through, and a plurality of second teeth 31 disposed adjacently in a circumferential direction on a surface of the base disc 32 facing the rotor 10.

The stator moving unit 40 changes a relative position between the first stator 20 and the second stator 30. In one example, the stator moving unit 40 of the present embodiment includes a rotation moving mechanism 41 and an axial moving mechanism 42.

In the stator moving unit 40, the rotation moving mechanism 41 can change the relative position (for example, the relative position (phase) in the circumferential direction of the teeth) between the first stator 20 and the second stator 30 in the circumferential direction (around the axis) of the rotation shaft 1. Examples of a structure of the rotation moving mechanism 41 include a known gear mechanism. The relative position between the first stator 20 and the second stator 30 can be changed under control of the controller 60 which will be described later.

In FIG. 1, both the first stator 20 and the second stator 30 are provided with the rotation moving mechanisms 41, respectively, but the disclosure is not limited to this form, the rotation moving mechanism 41 may be disposed on at least one of the first stator 20 or the second stator 30. In other words, the first stator 20 and the second stator 30 are not limited to the example in which each rotates around an axis to change the relative position, and may have a mode in which the relative position is changed by at least one of the first stator 20 or the second stator 30 rotating with respect to the other.

Further, in the stator moving unit 40, the axial moving mechanism 42 can change the relative position (in other words, a length of the gap (gap length)) between the first stator 20 and the second stator 30 in the axial direction along the rotation shaft 1. Examples of a structure of the axial moving mechanism 42 include a known actuator (cylinder mechanism and gear mechanism) or the like. With the axial moving mechanism 42, under the control of the controller 60 which will be described later, a component fixing the stator can be moved by a ball bearing or the like, or dislocated by an actuator attached to a pedestal of the stator.

The rotor vibration detector 50 detects a vibration state of the rotor 10. Here, the vibration state of the rotor 10 can be changed due to a rotation speed of the rotor 10, a surface shake due to rotation of the rotor 10 around the axis, a vibration of the axial gap motor 100 (that is, a vibration of the motor case 2), a vibration received from a road surface shape, or the like. Therefore, the rotor vibration detector 50 of the present embodiment includes a rotor sensor S1 and an external vibration sensor S2 in order to detect a parameter that influences the vibration state of the rotor 10.

In these sensors, in the present embodiment, the rotor sensor S1 includes a vibration frequency detection sensor 51 capable of detecting a surface shake (vibration and fluttering along the axial direction) during the rotation of the rotor 10 and a rotation speed detection sensor 52 capable of detecting the rotation speed of the rotor 10. As a specific example of the rotor sensors S1, various known detection sensors such as a non-contact optical sensor and an ultrasonic sensor may be applied.

Further, in the present embodiment, the external vibration sensor S2 includes a motor vibration detection sensor 53 provided in the motor case 2 and capable of detecting a vibration of the entire axial gap motor 100, and a tire vibration detection sensor 54 capable of detecting a vibration which is received by the vehicle V via tires during traveling and is caused by unevenness of the road surface or the like.

As specific examples of these external vibration sensors S2, in addition to the above-described optical sensor or the like, various known sensors such as a contact displacement sensor of a transformer type or a scale type can be applied.

In the present embodiment, as an external vibration that can influence the rotation of the rotor 10 of the axial gap motor 100, a vibration of the motor itself and a vibration from the road surface are exemplified, but the disclosure is not limited thereto, and other vibrations may be added.

Mode of Stator Moving Control

Figure 4:
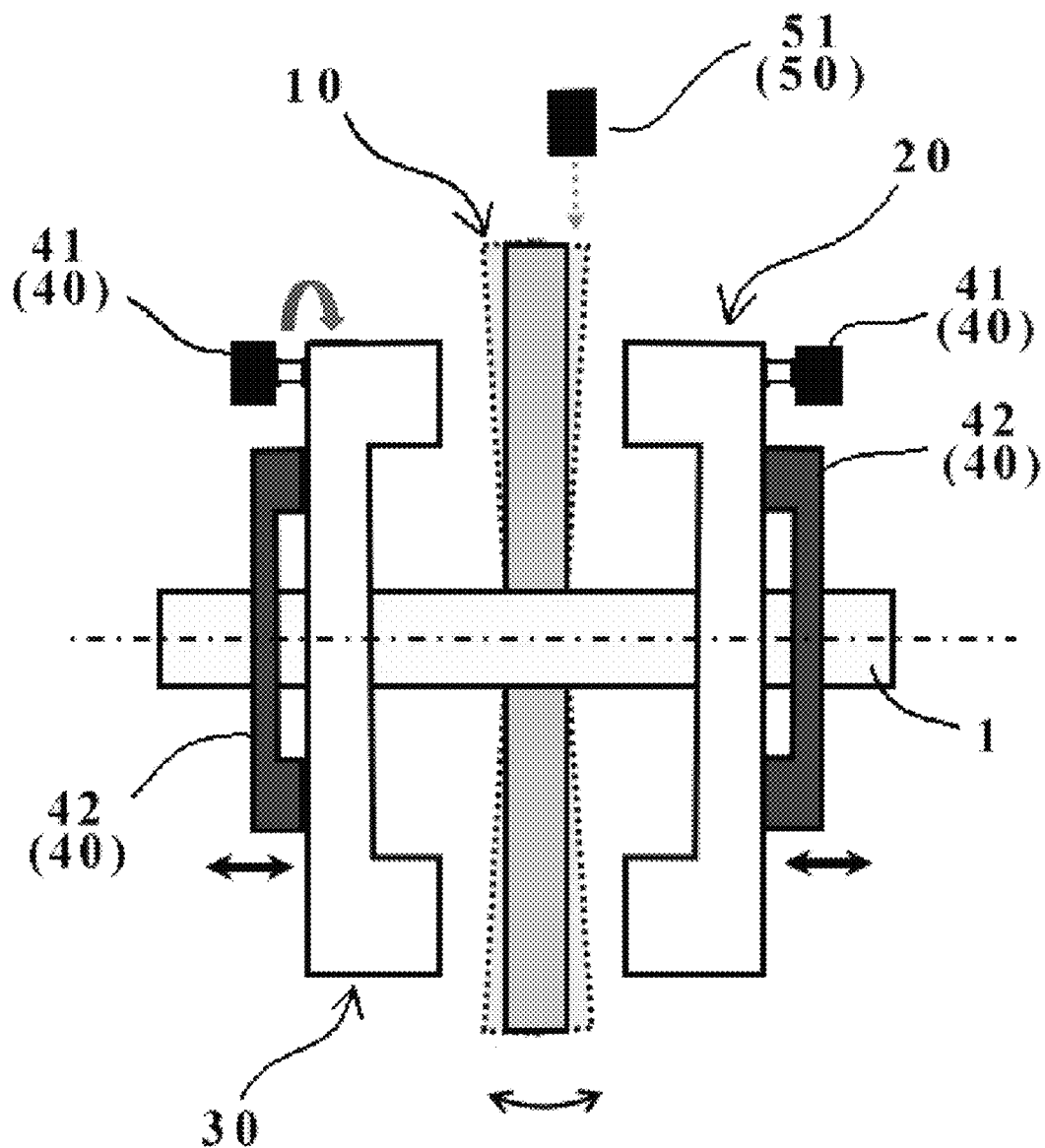
FIG. 4 is a schematic diagram illustrating a rotor vibration detector and a stator moving unit.

Next, a mode of relative movement (displacement) between the first stator 20 and the second stator 30 in the present embodiment will be described with reference to FIGS. 4 and 5.

In the axial gap motor 100 of the present embodiment, two stators sandwich one rotor, and the motor has a natural vibration due to an electromagnetic excitation force applied to the rotor by these two stators. Although the natural vibration can be calculated in advance by a known method, the natural vibration of the rotor changes due to the above-described disturbance influence or self-excited vibration, especially in the high-speed rotation region.

Therefore, in the axial gap motor 100 of the present embodiment, the rotor vibration detector 50 detects a change in a natural frequency (eigenfrequency) of the rotor caused by the external vibration. Then, the stator moving unit 40 displaces at least one of the first stator 20 or the second stator 30 with respect to the other such that the natural frequency of the rotor 10 after being changed by the external vibration and the natural frequency of the motor do not match and are different.

At this time, the stator moving unit 40 controls at least one of the first stator 20 or the second stator 30 to rotate around the axis with respect to the other.

In addition to the above-described control of rotation around the axis, the stator moving unit 40 may control at least one of the first stator 20 or the second stator 30 to move (approach or separate) with respect to the other in the axial direction. Accordingly, for example, when the vibration of the rotor does not stop even if the relative position between the stators around the axis is changed, by further controlling the gap length along the axial direction, a force applied to the rotor can be reduced and resonance of the rotor can be prevented.

Figure 5:
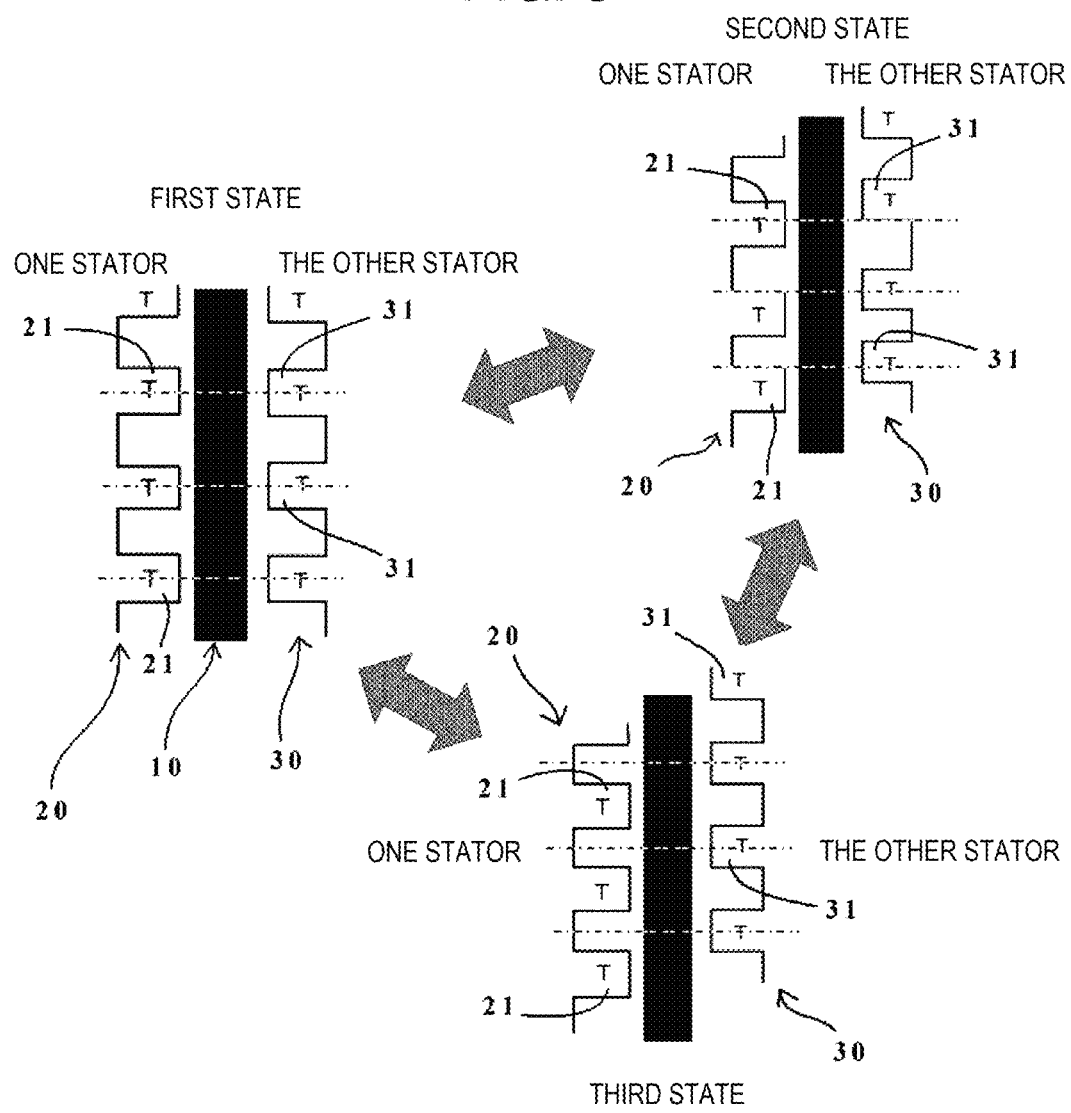
FIG. 5 is a schematic diagram illustrating a relative positional relationship between a pair of stators and a state transition in the pair of stators.

FIG. 5 illustrates an example in which at least one of the first stator 20 or the second stator 30 is rotated around the axis with respect to the other.

As can be understood from FIG. 5, any state among a first state to a third state can be obtained by relatively moving at least one of the first stator 20 or the second stator 30 in the axial gap motor 100 with respect to the other under the control of the controller 60.

First, in the first state, first teeth 21 of the first stator 20 and second teeth 31 of the second stator 30 exactly face each other while sandwiching the rotor 10. In other words, in the first state, the first stator 20 and the second stator 30 are positioned such that a phase of the first teeth 21 in the first stator 20 and a phase of the second teeth 31 in the second stator 30 match.

In addition to the purpose of avoiding the resonance of the rotor described above, in the axial gap motor 100 in the first state, as a first pattern, it is possible to generate a first torque having a relatively high torque, which is effective for, for example, sport traveling or rough road traveling. Therefore, when the rotor resonance does not occur, for example, by changing the state into any state among the first state to the third state, the driver can increase a maximum torque of the motor to select a powerful travel mode or to select a comfortable travel mode in which torque ripple is prevented.

Further, in the second state, the first teeth 21 of the first stator 20 and the second teeth 31 of the second stator 30 are 90° out of phase with respect to each other while sandwiching the rotor 10. In other words, in the second state, the first stator 20 and the second stator 30 are positioned such that half of each of the first teeth 21 in the first stator 20 and half of a respective one of the second teeth 31 in the second stator 30 exactly face each other.

In the axial gap motor 100 in the second state, as a third pattern intermediate between the first pattern described above and a second pattern which will be described later, torque characteristics in which both patterns are balanced can be exhibited.

In the third state, the first teeth 21 of the first stator 20 and the second teeth 31 of the second stator 30 are 180° out of phase with respect to each other while sandwiching the rotor 10. In other words, in the third state, the first stator 20 and the second stator 30 are positioned such that the first teeth 21 in the first stator 20 and a non-teeth portion in the second stator 30 exactly face each other.

In the axial gap motor 100 in the third state, as the second pattern, a second torque that is smaller than the first torque and whose fluctuation with time is prevented can be generated.

As described above, the axial gap motor 100 of the present embodiment is switchable between the first pattern in which the first teeth 21 of the first stator 20 and the second teeth 31 of the second stator 30 exactly face each other to generate the first torque, and the second pattern in which the first teeth 21 and the second teeth 31 do not exactly face each other to generate the second torque that is smaller than the first torque and whose fluctuation with time (torque ripple) is prevented.

Accordingly, for example, when a relatively large torque (in this case, a certain amount of fluctuation with time is allowed) is to be provided during sport traveling or rough road traveling, the generated torque can be increased by changing the relative position between the first stator 20 and the second stator 30 to the first pattern.

Further, when the vehicle travels on a road with relatively little acceleration and deceleration, such as at the time of traveling at a high speed or traveling in urban areas, for example, by changing the relative position between the first stator 20 and the second stator 30 to acquire the state of the second pattern, both low fuel consumption and traveling comfort can be achieved.

Method for Controlling Axial Gap Motor 100

Next, a method for controlling the axial gap motor 100 in the present embodiment will be described with reference to FIGS. 6 to 8. The control method to be detailed below is executed by the controller 60 programmed and mounted on the vehicle V.

Such a control program may be stored in a storage device MR mounted on the vehicle V, or may be downloadable from outside the vehicle using an external communication device CS via a known network NET such as a cloud.

Figure 6:
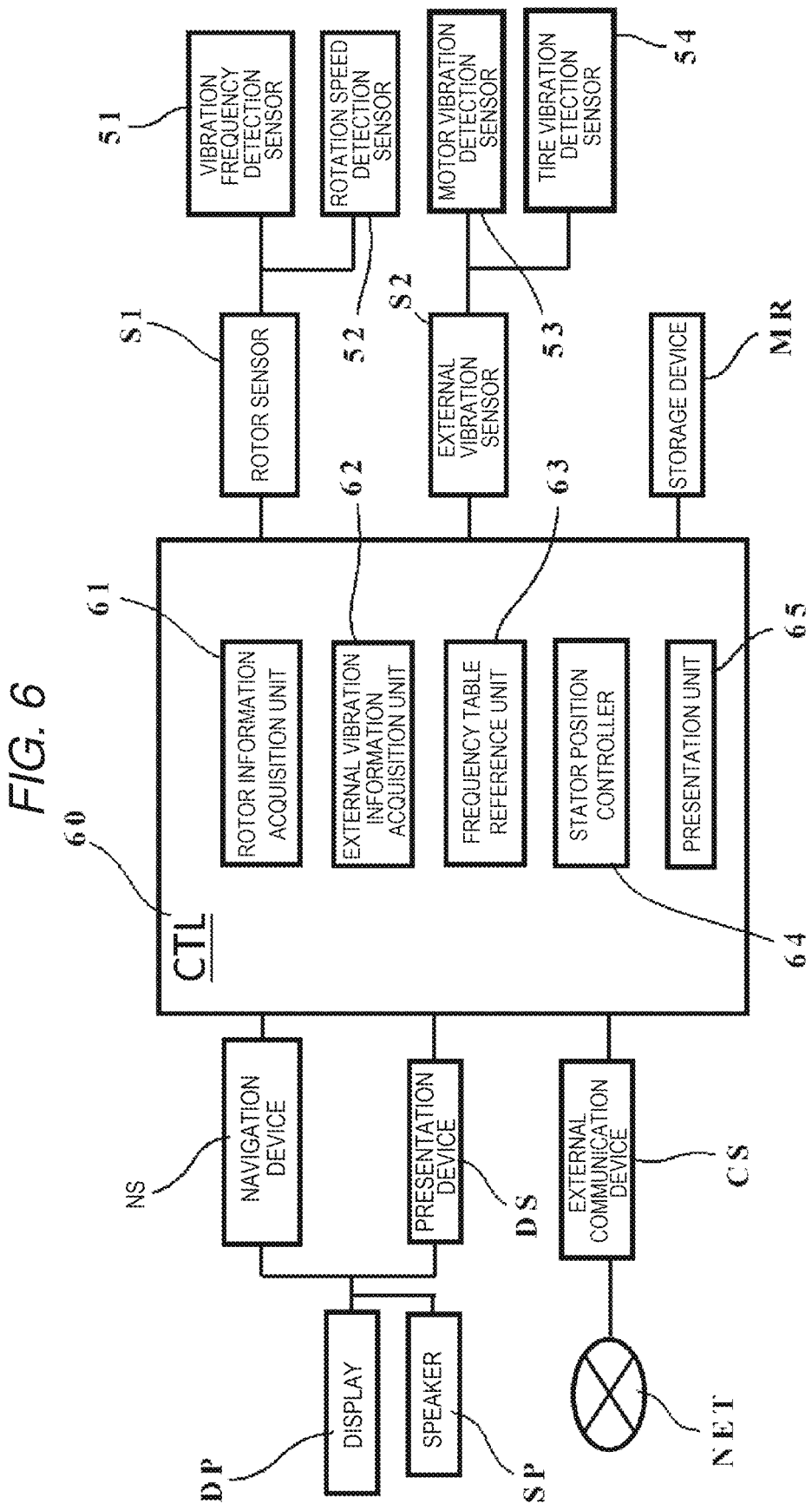
FIG. 6 is a functional block diagram of the vehicle of the embodiment.

The controller 60 is a known computer including a memory and a CPU and can be mounted on the vehicle, and as illustrated in FIG. 6, includes a rotor information acquisition unit 61, an external vibration information acquisition unit 62, a frequency table reference unit 63, a stator position controller 64, and a presentation unit 65.

Among these, the rotor information acquisition unit 61 acquires information on the rotor 10 (information on the rotation speed and the vibration frequency in this example) via the rotor sensor S1.

Further, the external vibration information acquisition unit 62 acquires, via the external vibration sensor S2, vibration information from the outside that may influence the rotation of the rotor 10.

Further, the frequency table reference unit 63 refers to a frequency and amplitude table showing a relationship between a frequency and an amplitude defined for each predetermined rotation speed. In the present embodiment, a configuration is adopted in which two stators sandwich the rotor, and the motor has a natural vibration due to the electromagnetic excitation force applied to the rotor by these two stators.

However, the electromagnetic excitation force of the natural vibration changes depending on the relative position of the stators, and therefore, the natural vibration also changes.

Therefore, in the present embodiment, the natural frequency of the axial gap motor 100 is calculated in advance by a simulation, an experiment, or the like for each predetermined rotation speed, and the frequency and amplitude table capable of determining the natural frequency is defined.

Figure 7:
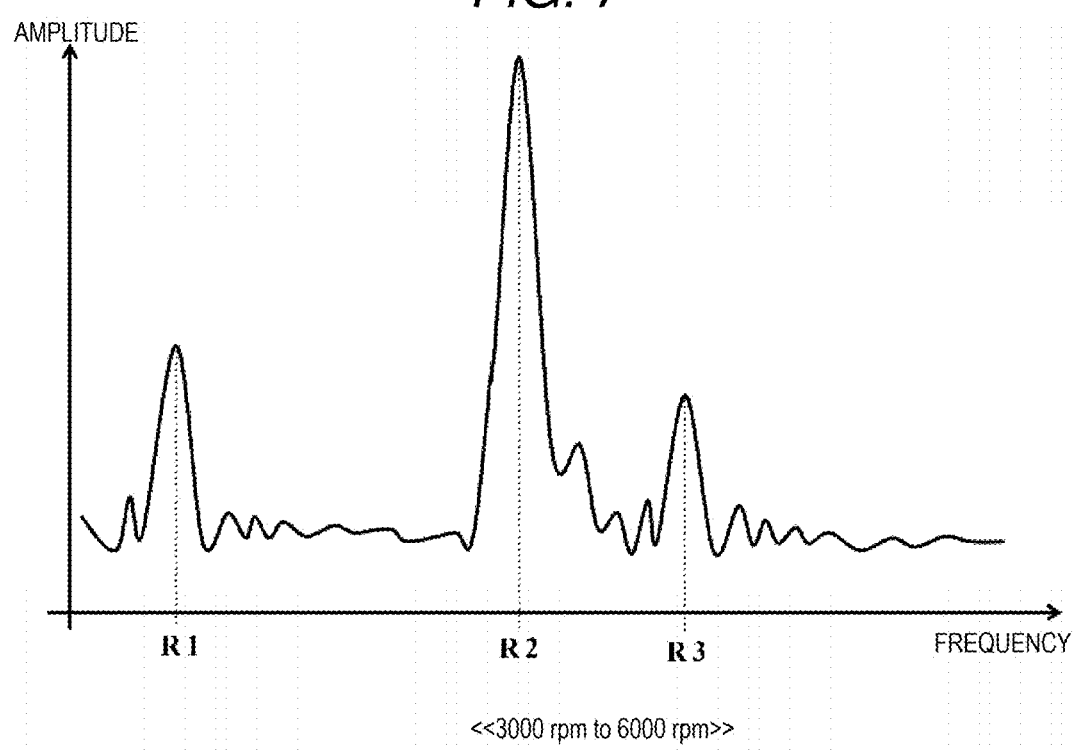
FIG. 7 is a schematic diagram illustrating an example of a frequency-amplitude characteristic for each rotation speed.
Figure 8:
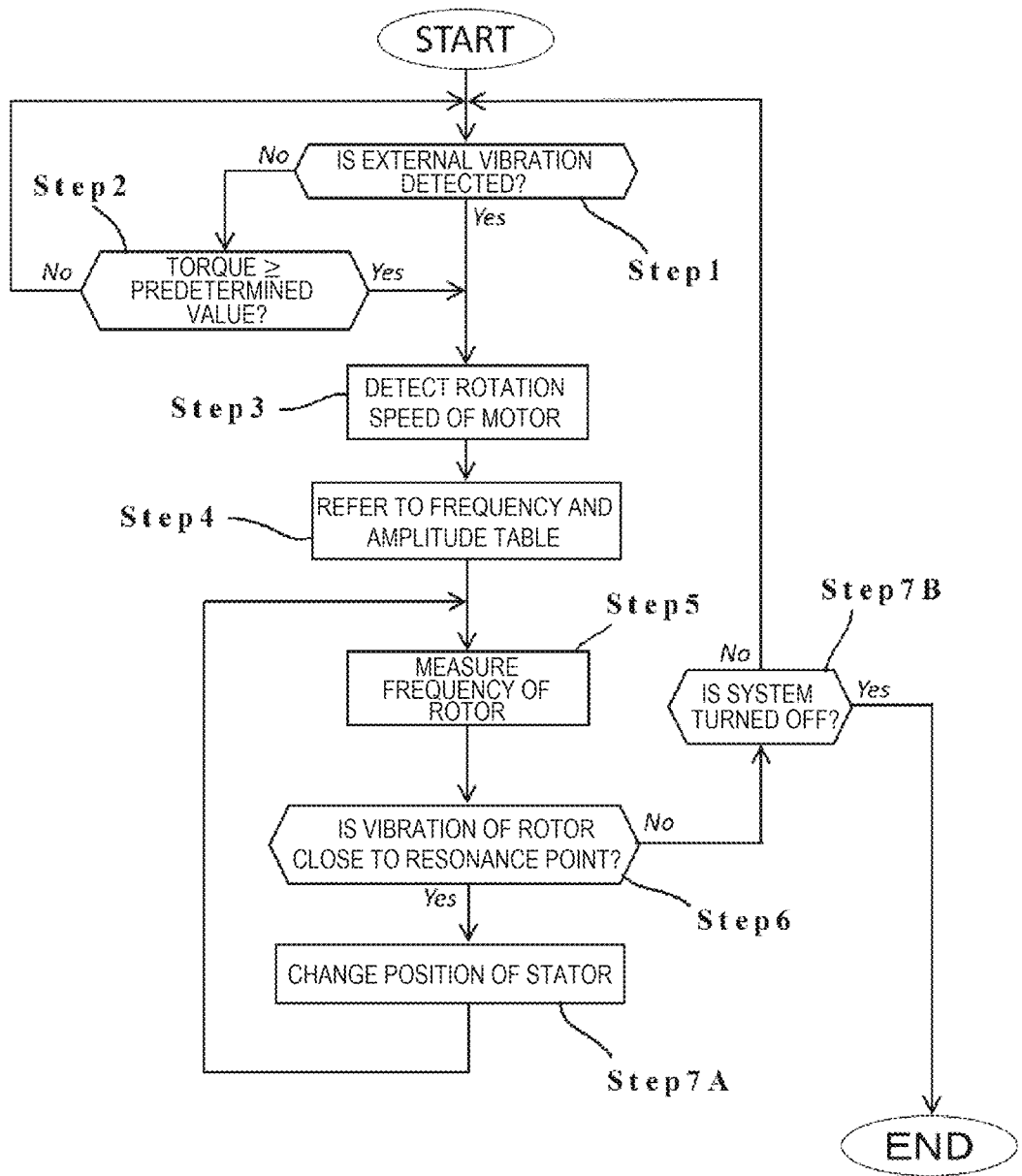
FIG. 8 is a flowchart of a method for controlling the axial gap motor in the embodiment.

As an example, FIG. 7 illustrates the frequency and amplitude table to be referred to when the rotation speed of the axial gap motor 100 is 3000 rpm to 6000 rpm. According to this table, it can be understood that the axial gap motor 100 of the present embodiment has a characteristic that the rotation speeds have resonance points in the vicinity of R1 to R3, respectively. The above is an example, and the frequency and amplitude table can be similarly defined by an experiment or a simulation in other rotation speed ranges.

Returning to FIG. 6, the stator position controller 64 relatively moves at least one of the first stator 20 or the second stator 30 with respect to the other via the stator moving unit 40.

Further, the presentation unit 65 can present an operating status or the like of the axial gap motor 100 via a speaker SP or a display DP which will be described later.

The vehicle V of the present embodiment includes a navigation device NS, a presentation device DS, the external communication device CS, the storage device MR, or the like. As described above, the vehicle V can be equipped with known in-vehicle sensors and devices other than the above.

The navigation device NS includes a GPS device for acquiring position information of the vehicle, and map information of an area name, a building, or the like.

In the present embodiment, the presentation device DS includes the known speaker SP and display DP that can be mounted on the vehicle. Among these, the display DP may also be used as a monitor of the navigation device NS which will be described later.

The external communication device CS can be, for example, a known communication device capable of performing packet communication using smartphones and various types of information communication with the outside in the vehicle using a next-generation automobile wireless communication technique represented by connected services.

The storage device MR can be, for example, a known hard disk drive, a non-volatile memory, or the like, and is a unit capable of temporarily recording a gaze event as necessary.
Gaze Target Detection Method Next, the method for controlling the axial gap motor 100 will be described with reference to FIG. 8. Here, it is assumed that, for example, when the generated torque of the axial gap motor 100 increases or when there is an external vibration, an electromagnetic force (Lorentz force) generated by a stator increases, an vibration influence on a rotor increases, or a vibration applied to the rotor due to road surface input or a gear vibration is complicated.

Therefore, in the present embodiment, in order to avoid resonance of the rotor 10 caused by the increase in vibration influence or the complication, the vibration state of the rotor 10 is constantly monitored, and a relative position between a pair of stators is changed when it is predicted that the natural vibrations of the stators match.

Accordingly, a frequency component of a vibration (electromagnetic force, Lorentz force) generated by the stator can be changed, and a resonance (critical speed) in which the rotor 10 resonates with and comes into contact with the stator can be avoided.

That is, in step 1, first, the controller 60 acquires external vibration information from the external vibration sensor S2. Then, when it is determined that an external vibration that influences the rotation of the rotor 10 is detected (Yes, in step 1), next, the rotation speed of the axial gap motor 100 is detected via the rotation speed detection sensor 52 in step 3.

On the other hand, when it is determined that the above-described external vibration is not detected (No in step 1), next, it is determined whether the generated torque of the axial gap motor 100 is equal to or larger than a predetermined value in step 2. A specific value of the generated torque that influences the rotation of the rotor 10 differs depending on the characteristics of the motor, and therefore, the specific value is calculated in advance by experiments and simulations.

When the generated torque is less than the predetermined value in step 2 (No in step 2), the controller 60 returns to step 1 again and continues the processing. Further, when the generated torque is equal to or larger than the predetermined value in step 2 (Yes in step 2), the processing of step 3 is executed.

After the rotation speed of the axial gap motor 100 is detected in step 3, in the following step 4, the controller 60 refers to the frequency and amplitude table according to the detected rotation speed. Accordingly, a frequency band where the resonance of the rotor 10 occurs can be determined.

Next, in step 5, the vibration frequency of the rotor 10 is detected via the vibration frequency detection sensor 51. At this time, the rotation of the rotor 10 is in a state in which factors of the increase in vibration influence and the complication are added. In other words, at this time, the rotor vibration detector 50 detects a change in the natural frequency of the rotor 10 caused by the external vibration.

In the following step 6, the controller 60 determines whether the detected vibration frequency of the rotor 10 is close to a resonance point with reference to the frequency and amplitude table. Then, when it is determined that the vibration of the rotor 10 does not cause resonance (No in step 6) and when a drive system including an inverter or the like is not turned off (No in step 7B), the processing returns to step 1 again and the above processing is continued.

On the other hand, when it is determined that the vibration frequency of the rotor 10 is close to the resonance point (Yes in step 6), in the following step 7A, the controller 60 changes the position of the stator. In one example, under the control of the controller 60, the stator moving unit 40 rotates at least one of the first stator 20 or the second stator 30 around the axis with respect to the other such that the natural frequency of the rotor (detected in step 5) after being changed by the external vibration and the natural frequency of the motor (refer to the frequency and amplitude table) do not match and are different.

For example, when the state of the stator during the above determination before the change is the first state, the controller 60 changes the stator to either one of the second state and the third state in order to make the natural frequency of the rotor not match the natural frequency of the motor. Accordingly, as illustrated in FIG. 9, the changed natural frequency of the rotor 10 and a new natural frequency of the motor (for example, the second state) do not match and are different, and a resonance (critical speed) in which the rotor 10 resonates with and comes into contact with the stator can be avoided.

Figure 9:
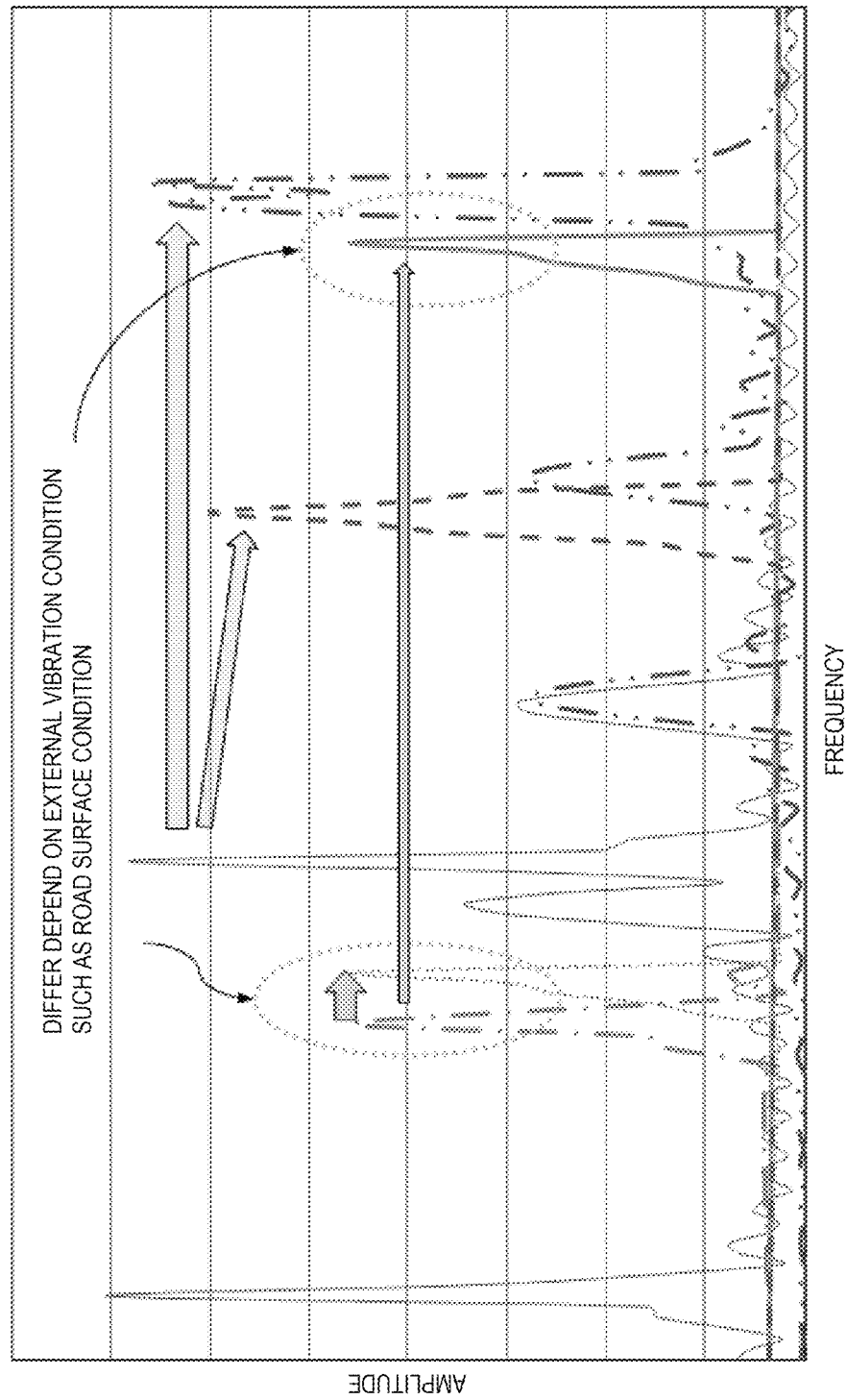
FIG. 9 is a schematic diagram illustrating avoidance of a resonance phenomenon that occurs in the rotor when a relative position between the pair of stators is changed.

In FIG. 9, a relationship between a frequency and an amplitude at an initial position of the stator is indicated by a thin solid line, the natural vibration of the rotor is indicated by a dashed-dotted line, a relationship between a frequency and an amplitude at a stator position after moving a predetermined distance from the initial position is indicated by a dashed double dotted line, the natural vibration of the rotor in a state where a certain disturbance is added is indicated by a dotted line, the natural vibration of the rotor in a state where another disturbance is added is indicated by a thick (dark) solid line, and a relationship between a frequency and an amplitude at a stator position after moving another predetermined distance from the initial position is indicated by a broken line.

As described above, the stator moving unit 40 of the present embodiment rotates at least one of the first stator 20 or the second stator 30 around the axis with respect to the other according to the detected change in the vibration state of the rotor 10.

At this time, according to the detected change in the vibration state of the rotor, the controller 60 may further move at least one of the first stator 20 or the second stator 30 along a rotation shaft direction while rotating at least one of the first stator 20 or the second stator 30 around the axis with respect to the other. Accordingly, during high-speed rotation, when rotation speed information from the motor is fed back and the rotation speed exceeds a preset rotation speed, by changing the stator position, it is possible to increase the length of the gap and further reduce a risk of contact between the rotor and the stator.

According to the axial gap motor 100 and the vehicle V including the motor in the present embodiment described above, even if the factors of the increase in vibration influence and the complication described above are added to the rotation of the rotor 10, it is possible to prevent a resonance phenomenon of the rotor and avoid the rotor and the stator from coming into contact with each other.

The embodiment of the disclosure has been described above with reference to the accompanying drawings. It is noted that the disclosure is not limited to such examples.

For example, when it is predicted that the natural frequency of the stator overlaps the vibration frequency of the rotor in the process of changing the stator position, the controller 60 may perform control to temporarily cut off a coil exciting current to the stator. Accordingly, the electromagnetic force generated in the stator can be prevented and temporal resonance of the rotor in the process of changing the stator position can be avoided.

As described above, it is clear that a person skilled in the art will attempt further modifications to the above-described embodiments, and it is understood that these also naturally belong to the technical scope of the disclosure.

The invention claimed is:

1. An axial gap motor comprising:
   a rotor supported by a rotation shaft;
   a first stator disposed so as to face the rotor with a predetermined gap therebetween in a longitudinal direction of the rotation shaft;
   a second stator disposed so as to face the rotor with a predetermined gap therebetween, the second stator facing the first stator with the rotor being disposed therebetween;
   a stator moving unit including an actuator, the stator moving unit configured to change a relative position between the first stator and the second stator in a circumferential direction of the rotation shaft; and
   a rotor vibration detector including one or more sensors, the one or more sensors configured to obtain one or more detection values representing a vibration state of the rotor, wherein
   the stator moving unit is configured to rotate at least one of the first stator or the second stator with respect to the other of the first stator or the second stator around an axis of the rotation shaft based on the one or more detection values.

2. The axial gap motor according to claim 1, wherein
   the rotor vibration detector is configured to detect a change in a natural frequency of the rotor caused by an external vibration, and
   the stator moving unit is configured to rotate the at least one of the first stator or the second stator around the axis with respect to the other in such a manner that the natural frequency of the rotor after being changed by the external vibration and a frequency of the axial gap motor do not match.

3. The axial gap motor according to claim 2,
   wherein the stator moving unit is configured to rotate the at least one of the first stator or the second stator with respect to the other of the first stator or the second stator around the axis of the rotation shaft to switch between:
   a first pattern in which teeth of the first stator and teeth of the second stator exactly face each other to generate a first torque; and
   a second pattern in which the teeth of the first stator and the teeth of the second stator do not exactly face each other to generate a second torque that is smaller than the first torque and fluctuates over time less than the first torque.

4. The axial gap motor according to claim 3, wherein
   the stator moving unit comprises an axial moving unit configured to move the at least one of the first stator or the second stator along the rotation shaft, and
   the stator moving unit is configured to move the at least one of the first stator or the second stator in the longitudinal direction of the rotation shaft while rotating the at least one of the first stator or the second stator around the axis with respect to the other according to the detected change in the vibration state of the rotor.

5. The axial gap motor according to claim 2, wherein
   the stator moving unit comprises an axial moving unit configured to move the at least one of the first stator or the second stator along the rotation shaft, and
   the stator moving unit is configured to move the at least one of the first stator or the second stator in the longitudinal direction of the rotation shaft while rotating the at least one of the first stator or the second stator around the axis with respect to the other according to the detected change in the vibration state of the rotor.

6. The axial gap motor according to claim 1,
wherein the stator moving unit is configured to rotate the at least one of the first stator or the second stator with respect to the other of the first stator or the second stator around the axis of the rotation shaft to switch between:
- a first pattern in which teeth of the first stator and teeth of the second stator exactly face each other to generate a first torque; and
- a second pattern in which the teeth of the first stator and the teeth of the second stator do not exactly face each other to generate a second torque that is smaller than the first torque and fluctuates over time less than the first torque.

7. The axial gap motor according to claim 6, wherein
the stator moving unit comprises an axial moving unit configured to move the at least one of the first stator or the second stator along the rotation shaft, and
the stator moving unit is configured to move the at least one of the first stator or the second stator in the longitudinal direction of the rotation shaft while rotating the at least one of the first stator or the second stator around the axis with respect to the other according to a change detected in the vibration state of the rotor using the rotor vibration detector.

8. The axial gap motor according to claim 1, wherein
the stator moving unit comprises an axial moving unit configured to move the at least one of the first stator or the second stator along the rotation shaft, and
the stator moving unit is configured to move the at least one of the first stator or the second stator in the longitudinal direction of the rotation shaft while rotating the at least one of the first stator or the second stator around the axis with respect to the other according to a change detected in the vibration state of the rotor using the rotor vibration detector.

9. A vehicle comprising:
the axial gap motor according to claim 1.

10. A vehicle comprising:
the axial gap motor according to claim 2.

11. A vehicle comprising:
the axial gap motor according to claim 6.

12. A vehicle comprising:
the axial gap motor according to claim 3.

13. A vehicle comprising:
the axial gap motor according to claim 8.

14. A vehicle comprising:
the axial gap motor according to claim 5.

15. A vehicle comprising:
the axial gap motor according to claim 7.

16. A vehicle comprising:
the axial gap motor according to claim 4.

17. The axial gap motor according to claim 1, wherein the one or more sensors include a vibration frequency detection sensor, the vibration frequency detection sensor is configured to obtain a vibration frequency of the rotor during the rotation of the rotor.

18. The axial gap motor according to claim 17, wherein
the one or more sensors further include a motor vibration detection sensor that is provided in a case that accommodates at least the rotor, and
the motor vibration detection sensor is configured to detect a vibration of an entirety of the axial gap motor.

19. The axial gap motor according to claim 17, further comprising the controller, wherein
the controller is configured to:
- execute comparing the vibration frequency of the rotor with a natural frequency of the axial gap motor; and
- cause the stator moving unit to rotate the at least one of the first stator or the second stator with respect to the other of the first stator or the second stator around the axis of the rotation shaft based on a result of the comparing.

20. An axial gap motor system comprising
an axial gap motor including:
- a rotor supported by a rotation shaft;
- a first stator disposed so as to face the rotor with a predetermined gap therebetween in a longitudinal direction of the rotation shaft;
- a second stator disposed so as to face the rotor with a predetermined gap therebetween, the second stator facing the first stator with the rotor being disposed therebetween;
- a stator moving unit including an actuator, the stator moving unit configured to change a relative position between the first stator and the second stator in a circumferential direction of the rotation shaft; and
- a rotor vibration detector including one or more sensors, the one or more sensors configured to obtain one or more detection values representing a vibration state of the rotor, and
a controller configured to cause the stator moving unit to rotate at least one of the first stator or the second stator with respect to the other of the first stator or the second stator around an axis of the rotation shaft based on the one or more detection values.

* * * * *